(12) United States Patent
Pabon (10) Patent No.: US 8,861,307 B2
(45) Date of Patent: Oct. 14, 2014

(54) ACOUSTIC LOGGING WHILE DRILLING TOOL WITH ACTIVE CONTROL OF SOURCE ORIENTATION

(75) Inventor: Jahir Pabon, Newton, MA (US)

(73) Assignee: Schlumberger Technology Corporation, Sugar Land, TX (US)

(*) Notice: Subject to any disclaimer, the term of this patent is extended or adjusted under 35 U.S.C. 154(b) by 405 days.

(21) Appl. No.: 13/232,419

(22) Filed: Sep. 14, 2011

(65) Prior Publication Data

US 2013/0064039 A1    Mar. 14, 2013

(51) Int. Cl.
*G01V 1/46* (2006.01)
*G01V 1/52* (2006.01)

(52) U.S. Cl.
CPC .. *G01V 1/46* (2013.01); *G01V 1/52* (2013.01); *G01V 2210/127* (2013.01)
USPC .............................................. 367/25; 181/104

(58) Field of Classification Search
CPC ............. G01V 1/44; G01V 1/46; G01V 1/48; G01V 1/52
USPC .......................... 367/25, 32, 33; 181/102, 104
See application file for complete search history.

(56) References Cited

U.S. PATENT DOCUMENTS

| | | | |
|---|---|---|---|
| 4,594,691 A | 6/1986 | Kimball et al. | |
| 5,852,587 A | 12/1998 | Kostek et al. | |
| 6,308,137 B1 | 10/2001 | Underhill et al. | |
| 6,366,531 B1* | 4/2002 | Varsamis et al. | 367/26 |
| 6,671,224 B1 | 12/2003 | Pabon | |
| 6,842,400 B2 | 1/2005 | Blanch et al. | |
| 6,956,790 B2 | 10/2005 | Haldorsen | |
| 7,000,700 B2 | 2/2006 | Cairns et al. | |
| 7,252,174 B2 | 8/2007 | Cox et al. | |
| 7,336,562 B1 | 2/2008 | Hoyle et al. | |
| 7,350,568 B2* | 4/2008 | Mandal et al. | 166/254.2 |
| 7,623,412 B2 | 11/2009 | Pabon et al. | |
| 7,627,193 B2 | 12/2009 | Alon et al. | |
| 8,593,147 B2* | 11/2013 | Bittar | 324/339 |
| 2005/0173185 A1 | 8/2005 | Pabon et al. | |
| 2007/0268782 A1 | 11/2007 | Pabon et al. | |
| 2008/0170466 A1 | 7/2008 | Mickael | |
| 2009/0222209 A1* | 9/2009 | Morys | 702/9 |
| 2010/0312477 A1* | 12/2010 | Sanstrom et al. | 702/6 |
| 2011/0251794 A1* | 10/2011 | Bittar et al. | 702/11 |
| 2012/0249149 A1* | 10/2012 | Bittar et al. | 324/337 |

FOREIGN PATENT DOCUMENTS

| | | |
|---|---|---|
| EP | 0837217 | 4/1998 |
| WO | 9848140 | 10/1998 |
| WO | 9935490 | 7/1999 |

OTHER PUBLICATIONS

International Search Report of PCT Application No. PCT/US2012/053269 dated Feb. 14, 2013: pp. 1-3.
Haldorsen et al., "High Resolution Imaging From Full-Waveform Sonic Data," SPWLA India Regional Symposium, Apr. 2007: pp. 1-5.
Yamamoto et al., "CIM 65538: Borehole Acoustic Reflection Survey Experiments in Horizontal Wells for Accurate Well Positioning," SPE International, 2000: pp. 1-7.

* cited by examiner

*Primary Examiner* — Ian J Lobo
(74) *Attorney, Agent, or Firm* — Bridget Laffey; Jakub M. Michna (57) ABSTRACT

The subject disclosure relates to sonic logging while drilling. A transmitter and at least one receiver are mounted on a drill collar for performing sonic investigations of the formation traversing a borehole.

16 Claims, 6 Drawing Sheets

ACOUSTIC LOGGING WHILE DRILLING TOOL WITH ACTIVE CONTROL OF SOURCE ORIENTATION

FIELD

The subject disclosure generally relates to formation evaluation. More particularly, the subject disclosure relates to sonic measurements while drilling or wireline sonic logging.

BACKGROUND

A downhole acoustic logging tool generally contains one or a plurality of acoustic sources and an array of acoustic receivers. The one or a plurality of acoustic sources can be of a multi-pole nature (generally monopole, dipole and quadrupole). A multi-pole source is made up of two more elements placed at the same axial location on the tool and generally equally spaced around the circumference. At least two source elements are needed for an acoustic dipole field and at least four are needed for a quadrupole field. The array of acoustic receivers is decided so as to capture the multi-pole nature of the propagating acoustic field. In general 4-12 acoustic receivers are placed along the tool axis; with each receiver comprising one or more acoustic sensing elements distributed along the tool circumference (at least two are needed to capture dipole and at least four are needed to capture quadrupole).

A logging event consists of firing the one or more individual elements of an acoustic source to generate a desired acoustic field in the borehole (generally monopole, dipole or quadrupole); and recording the acoustic (pressure) signal at each of the receivers' sensing elements, as it propagates along the wellbore. The recorded traces are processed, first to extract the different acoustic field components (monopole, dipole or quadrupole). Each of those field components is further processed to extract acoustic properties of the formation being traversed by the wellbore.

It is widely known that in acoustic logging while drilling, because of the generally strong acoustic noise generated by the drilling operation, there is a need to stack (add up) the traces recorded by several individual logging events (typically 16-64 traces) in order to enhance the signal to noise ratio. The basic idea is that the signal being excited by repeated firings of the acoustic source will be nicely correlated and therefore will add up. In contrast, the signal from a drilling noise will be largely uncorrelated and therefore will tend to cancel out. The stacking then improves the quality of the subsequent processing.

Stacking works well when the tool is not rotating between source firings or the formation being traversed by the wellbore exhibits acoustic isotropic behavior around the wellbore axis i.e. if the acoustic field generated in the wellbore by the firing of a multi-pole source is the same independent of the orientation of the source as the tool rotates. However, more often than not, this is not the case, particularly when drilling highly deviated wells. In this situation, the stacking will tend to average out important information about the anisotropic properties of the formation.

It is possible to have sensors in the tool that measure and record the instantaneous tool face angle (i.e. the instantaneous orientation as the tool rotates) that goes along with each logging event. The stacking can then be done on logging events that correspond to similar (or equivalent) instantaneous tool orientations. However, the stacked events will generally extend over an appreciable number of tool revolutions, and the tool might have moved appreciably (because of the drilling operation) during that time. The stacking will tend to average out variations in the rock properties along the wellbore.

Therefore, a better solution is desired to improve the quality of acoustic logging while drilling when the formation exhibits acoustic anisotropy.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

According to embodiments an acoustic borehole logging tool is disclosed. The tool comprises an acoustic source and an acoustic receiver. The acoustic source comprises a plurality of source elements. Each of the plurality of source elements is independently controlled so that the acoustic source can generate a multi-pole acoustic signal along different orientations with respect to the tool.

According to further embodiments a method for independently controlling each source element of an acoustic source of an acoustic borehole logging tool is disclosed. The method comprises sensing an instantaneous tool face angle; modulating amplitude of a firing signal for each source element in a plurality of source elements according to the instantaneous tool face angle and firing an acoustic signal.

Further features and advantages of the subject disclosure will become more readily apparent from the following detailed description when taken in conjunction with the accompanying drawings.

BRIEF DESCRIPTION OF THE DRAWINGS

The subject disclosure is further described in the detailed description which follows, in reference to the noted plurality of drawings by way of non-limiting examples of embodiments of the subject disclosure, in which like reference numerals represent similar parts throughout the several views of the drawings, and wherein.

DETAILED DESCRIPTION

The particulars shown herein are by way of example and for purposes of illustrative discussion of the embodiments of the subject disclosure only and are presented in the cause of providing what is believed to be the most useful and readily understood description of the principles and conceptual aspects of the subject disclosure. In this regard, no attempt is made to show structural details in more detail than is necessary for the fundamental understanding of the subject disclosure, the description taken with the drawings making apparent to those skilled in the art how the several forms of the subject disclosure may be embodied in practice. Furthermore, like reference numbers and designations in the various drawings indicate like elements.

Figure 1:
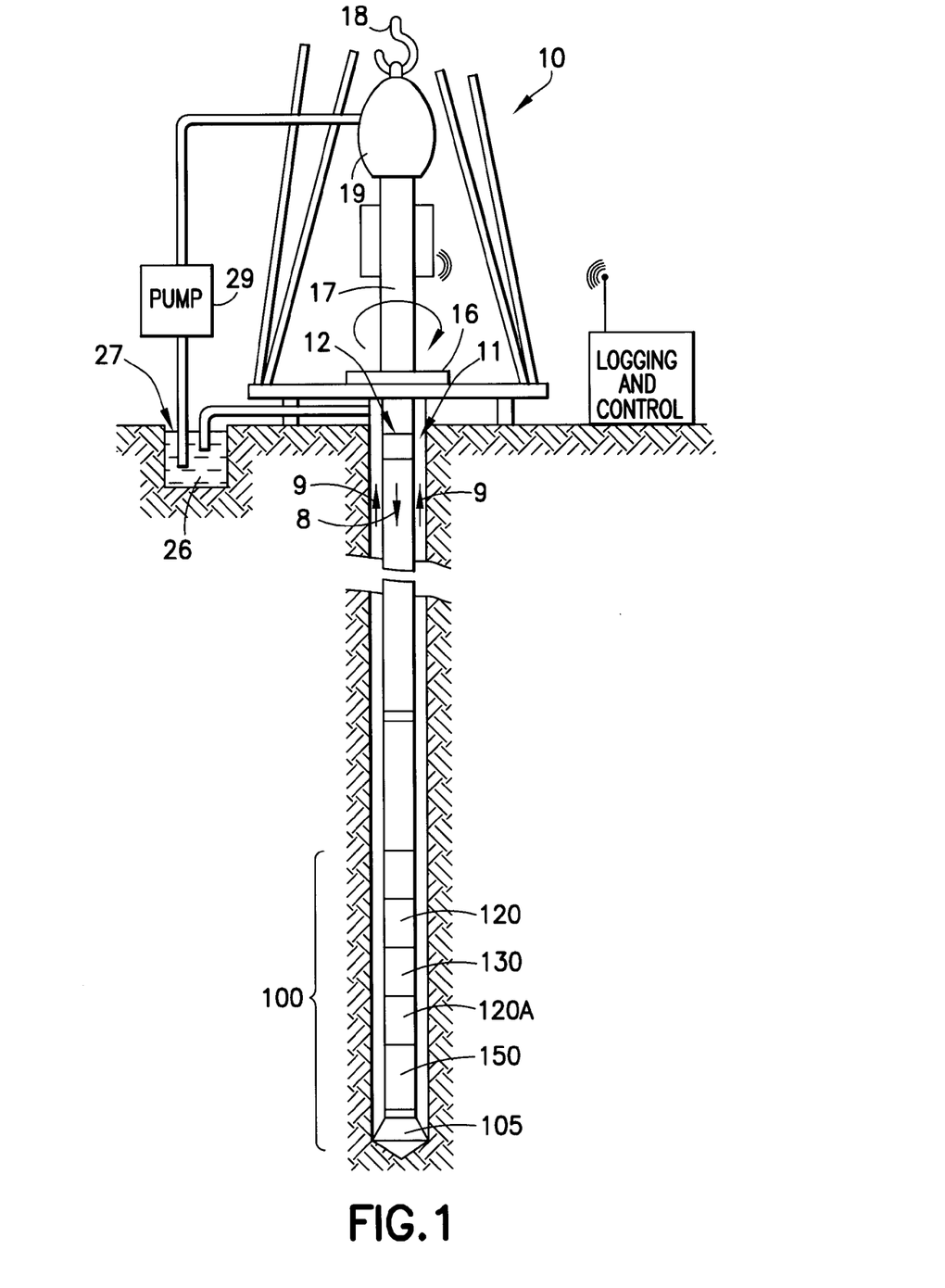
FIG. 1 depicts a wellsite system in which the subject disclosure may be employed.

FIG. 1 illustrates a wellsite system in which the subject disclosure can be employed. The wellsite can be onshore or offshore. In this exemplary system, a borehole 11 is formed in subsurface formations by rotary drilling in a manner that is well known. Embodiments of the subject disclosure can also use directional drilling, as will be described hereinafter.

A drill string 12 is suspended within the borehole 11 and has a bottom hole assembly 100 which includes a drill bit 105 at its lower end. The surface system includes platform and derrick assembly 10 positioned over the borehole 11, the assembly 10 including a rotary table 16, kelly 17, hook 18 and rotary swivel 19. The drill string 12 is rotated by the rotary table 16, energized by means not shown, which engages the kelly 17 at the upper end of the drill string. The drill string 12 is suspended from a hook 18, attached to a traveling block (also not shown), through the kelly 17 and a rotary swivel 19 which permits rotation of the drill string relative to the hook. As is well known, a top drive system could alternatively be used.

In the example of this embodiment, the surface system further includes drilling fluid or mud 26 stored in a pit 27 formed at the well site. A pump 29 delivers the drilling fluid 26 to the interior of the drill string 12 via a port in the swivel 19, causing the drilling fluid to flow downwardly through the drill string 12 as indicated by the directional arrow 8. The drilling fluid exits the drill string 12 via ports in the drill bit 105, and then circulates upwardly through the annulus region between the outside of the drill string and the wall of the borehole, as indicated by the directional arrows 9. In this well known manner, the drilling fluid lubricates the drill bit 105 and carries formation cuttings up to the surface as it is returned to the pit 27 for recirculation.

The bottom hole assembly 100 of the illustrated embodiment has a logging-while-drilling (LWD) module 120, a measuring-while-drilling (MWD) module 130, a roto-steerable system and motor, and drill bit 105.

The LWD module 120 is housed in a special type of drill collar, as is known in the art, and can contain one or a plurality of known types of logging tools. It will also be understood that more than one LWD and/or MWD module can be employed, e.g. as represented at 120A. (References, throughout, to a module at the position of 120 can alternatively mean a module at the position of 120A as well.) The LWD module includes capabilities for measuring, processing, and storing information, as well as for communicating with the surface equipment. In the present embodiment, the LWD module includes a sonic measuring device.

The MWD module 130 is also housed in a special type of drill collar, as is known in the art, and can contain one or more devices for measuring characteristics of the drill string and drill bit. The MWD tool further includes an apparatus (not shown) for generating electrical power to the downhole system. This may typically include a mud turbine generator powered by the flow of the drilling fluid, it being understood that other power and/or battery systems may be employed. In the present embodiment, the MWD module includes one or more of the following types of measuring devices: a weight-on-bit measuring device, a torque measuring device, a vibration measuring device, a shock measuring device, a stick slip measuring device, a direction measuring device, and an inclination measuring device.

Figure 2:
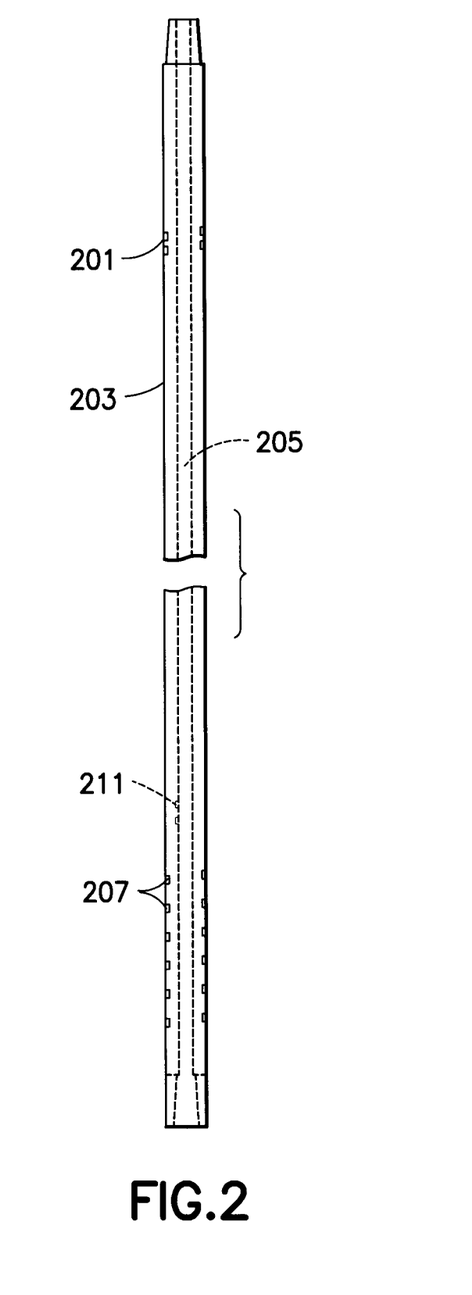
FIG. 2 depicts a sonic logging-while-drilling tool.

FIG. 2 illustrates a sonic logging-while-drilling tool which can be the LWD tool 120, or can be a part of an LWD tool suite 120A of the type described in U.S. Pat. No. 6,308,137, incorporated herein by reference. FIG. 2 illustrates selected components of a sonic logging while drilling tool 120 schematically according to embodiments of the subject disclosure. A pipe portion (203) defines a mud channel (205) and distributed on the pipe portion (203) are one or a plurality of transmitters (201) capable of at least monopole, dipole and quadrupole firings. A receiver (207) or a plurality of receivers (207) and receiver electronics (211) are distributed on the pipe portion (203). A processing system controls the firing of the transmitters (201) and the receiver electronics (211). The processing facility can be located in one or more locations at the wellsite. According to some embodiments, the processing and interpretation of the data from the tools is performed at one or more locations remote from the wellsite. The processing facility may include one or more central processing units, storage system, communications and input/output modules, a user display and a user input system.

According to some embodiments an acoustic LWD tool is disclosed. The tool comprises at least one acoustic source with multiple source elements distributed around a drill collar, each source element independently controlled so that the acoustic source as a whole can generate acoustic signals of multi-pole nature along different orientations with respect to the tool body. The tool also has one or more sensors that are used to determine the instantaneous tool face angle or collar orientation as the tool rotates. According to some embodiments, the one or more sensors may be a combination of an accelerometer, a gyro and/or a magnetometer.

The tool also includes an array of acoustic receivers. Each receiver is made of multiple acoustic sensing elements distributed around the collar wall. Each sensing element in the receiver is independently recorded, so that by appropriate weighting of the recorded signals, the different multi-pole components of the acoustic signal propagating along the well along any desired orientation may be extracted.

The tool also includes source firing electronics that uses the measured instantaneous tool face (collar orientation) to control the firing of the individual source elements so that the direction of the multi-pole acoustic signal generated by the acoustic source as a whole has one or more predetermined orientations. Firing at two orthogonal orientations (90° angle between orientations for dipole, 45° for quadrupole) may be used to facilitate processing that leads to extraction of anisotropic rock properties. See U.S. Pat. No. 7,623,412, entitled "Anisotropy measurement while drilling", the contents of which are herein incorporated by reference.

According to some embodiments, as the tool rotates, the one or two directions of the multi-pole acoustic signal generated by the source are to be kept geo-stationary to facilitate the stacking of the multiple individual logging events associated with each of the source directions. This is to enhance signal to noise ratio as explained above, without averaging out the anisotropic properties of the formation.

According to some embodiments, to allow appropriate control of the direction of the multi-pole acoustic field, a plurality of source elements is necessary. In non-limiting examples, for a dipole the number of source elements is at least four, in other examples, the number of source elements is at least eight for a dipole or a quadrupole, and in other non-limiting examples, the number of source elements is at least 16, for a source that, as a whole can excite dipole and quadrupole acoustic fields at arbitrary orientations around the tool axis.

Figure 3:
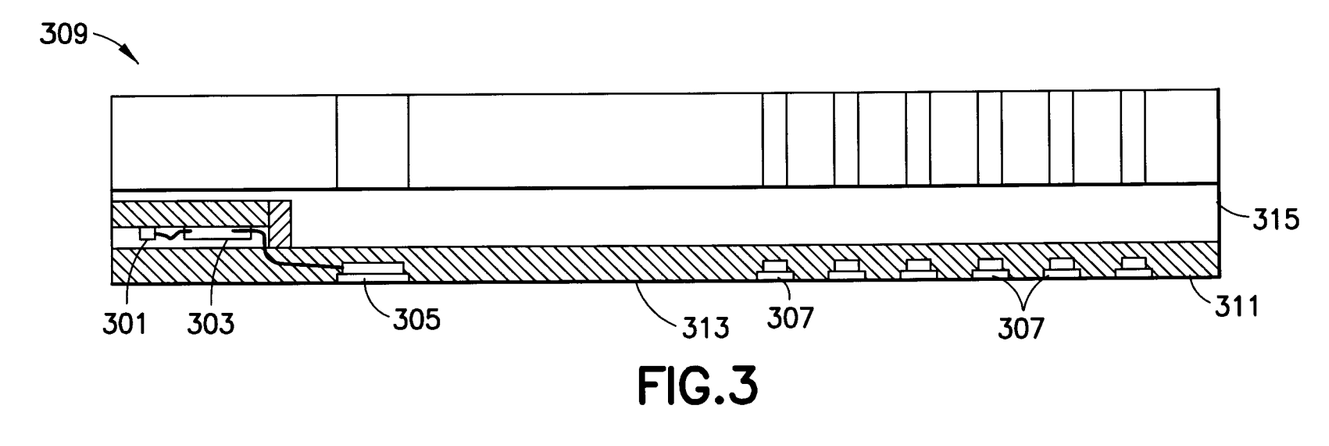
FIG. 3 depicts a logging while drilling acoustic tool with active source orientation control.

FIG. 3 depicts an embodiment of a logging while drilling (LWD) acoustic tool (309) with active source orientation control. FIG. 3 illustrates selected components of the LWD tool (309) schematically according to one embodiment. The drill string (12) of FIG. 1 includes a plurality of drill collars. The LWD tool (309) may comprise the same general shape as one or more of the drill collars, including a pipe portion (313). The pipe portion (313) defines a mud channel (315). The LWD tool (309) has at least one acoustic source (305) with multiple source elements distributed around the collar circumference, each source element independently controlled so that the acoustic source (305) as a whole can generate signals of multi-pole nature, including monopole, dipole and quadrupole, along different orientations with respect to the tool body. The LWD tool (309) also has one or a plurality of sensors (301) that are used to determine the instantaneous tool face angle i.e. the collar orientation as the collar rotates. The plurality of sensors (301) may comprise a combination of an accelerometer, gyro and/or magnetometer. The LWD tool (309) further comprises an array of acoustic receivers or acoustic sensors (307). Each acoustic receiver (307) is made up of multiple acoustic sensing elements distributed around the collar wall (311). Each acoustic sensing element in the acoustic receiver is independently recorded, so that by appropriate weighting of the recorded signals, the different multi-pole components of the acoustic signal propagating along the well along any desired orientation can be extracted.

The LWD tool (309) may also comprise source firing electronics (303) that uses the measured instantaneous tool face (collar orientation) to control the firing of the individual source elements so that the direction of the multi-pole acoustic signal generated by the acoustic source (305) as a whole has one or more predetermined orientations.

Figure 4:
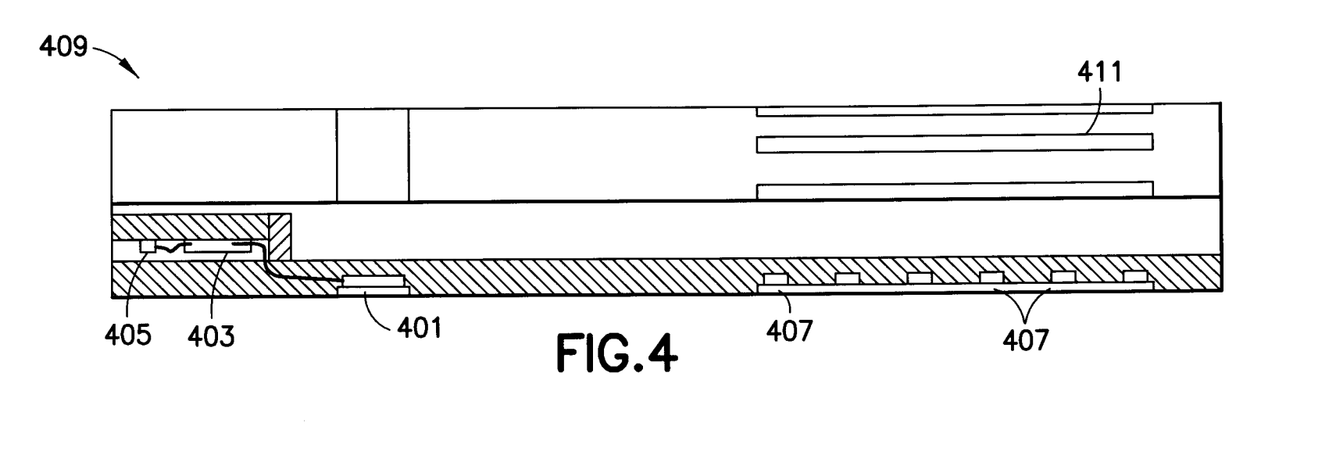
FIG. 4 depict an alternate embodiment of a logging while drilling acoustic tool with active source orientation control.

FIG. 4 depicts an alternate embodiment of a logging while drilling (LWD) acoustic tool (409) with active source orientation control. The acoustic sensing elements are placed in axial grooves (411) disposed in an outer surface of the LWD tool. Other methods of disposing the acoustic sensing elements on the LWD tool are contemplated, for example, each acoustic sensing element may be a blank hole machined on the LWD tool collar. The LWD tool (409) has source electronics (403), collar orientation sensors (405), acoustic sensors (407) and one or more multipole acoustic source(s) (401) similar to the LWD tool (309) of FIG. 3.

Figure 5:
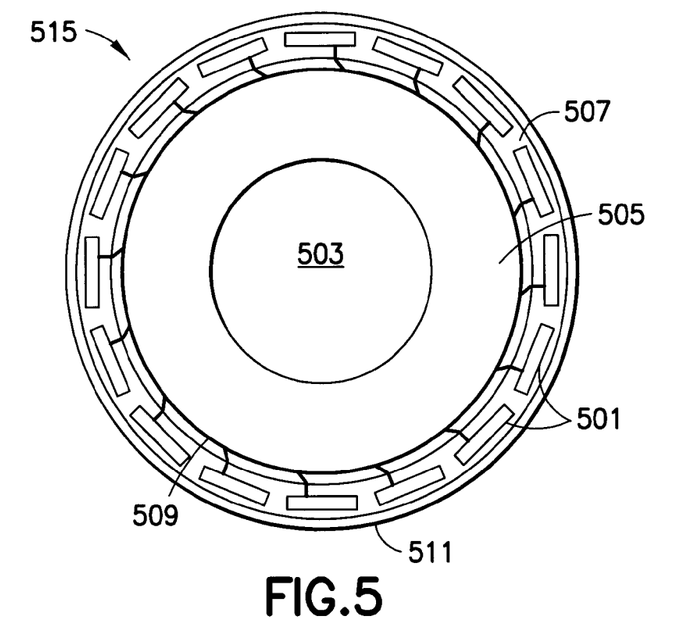
FIG. 5 depicts a cross section of a logging while drilling tool through the acoustic source.

FIG. 5 shows a cross section of a multipole acoustic source (515), which in this non-limiting example is made up of 16 individually controlled source elements (501) which form the multipole acoustic source (515) transmitter. The individually controlled source elements (501) are embedded in grooves disposed in an insulating material (507) in a drill collar (505). A protective shield (511) surrounds and protects the individually controlled source elements (501). In one non-limiting example this protective shield (511) is steel. A mud channel (503) of the drill collar (505) is also present. The firing of each source element (501) is independently controlled. To allow appropriate control of the direction of the multi-pole acoustic field, the number of source elements (501) is at least eight. In other non-limiting embodiments the number of source elements (501) is at least four for dipole and eight for dipole and quadrupole. This is for an acoustic source which as a whole can excite dipole and quadrupole acoustic fields at arbitrary orientations around the tool axis.

Figure 6:
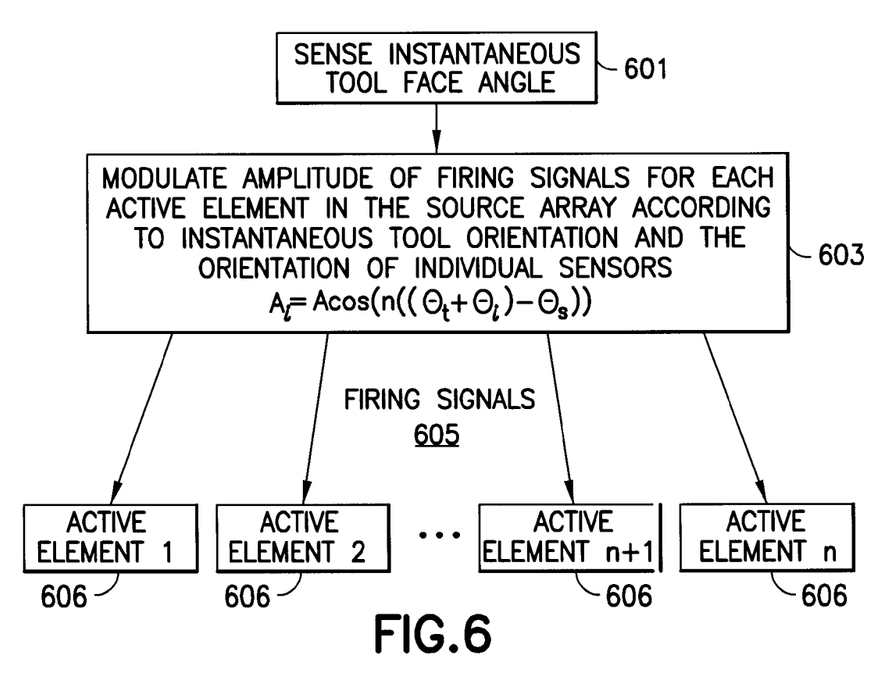
FIG. 6 depicts a flow diagram of the independent control of each source element.

FIG. 6 is a simple flow diagram of some embodiments of the subject disclosure. FIG. 6 depicts a process to follow when firing the source. The modulated amplitudes of the individual source elements are to be based on the desired multi-pole nature of the acoustic field to be excited, the desired orientation of that field in geostationary coordinates, and the relative orientation of each individual element with respect to the desired multi-pole source orientation. A typical expression for the amplitude of each source element is as follows:

$$A_i = A \cos(n((\theta_t + \theta_i) - \theta_s))$$ Equation 1 where A is a parameter representing the strength of the source as a whole; n indicates the type of acoustic field to be generated (0 for monopole, 1 for dipole, 2 for quadrupole); $\theta_t$ is the instantaneous tool face orientation measured by the one or more tool face orientation sensors in the tool; $\theta_i$ is the orientation of the individual source element with respect to the reference tool face; $\theta_s$ is the desired orientation of the multi-pole acoustic field to be generated by the source as whole; and $A_i$ is the strength of the signal applied to the ith source element. Both $\theta_t$ and $\theta_s$ are measured with respect to a geostationary coordinate system (typically $\theta_s=0$ and indicates "up", 90°→east, 180°→down, 270°→west).

By keeping a constant geostationary direction of the multi-pole acoustic field excited by the source in between consecutive individual logging events (even as the tool rotates), those events can be stacked to enhance signal to noise without averaging out the anisotropic properties of the rock.

Referring to FIG. 6 the process for firing the acoustic source comprises a first step (601) of sensing instantaneously a tool face angle. The second step (603) is modulating the amplitude of firing signals for each active element in the source array according to the instantaneous tool orientation and the orientation of individual sensors using Equation 1 above. The third step (605) is the firing of a plurality of signals (605) in each of the individual source elements (606).

Figure 7:
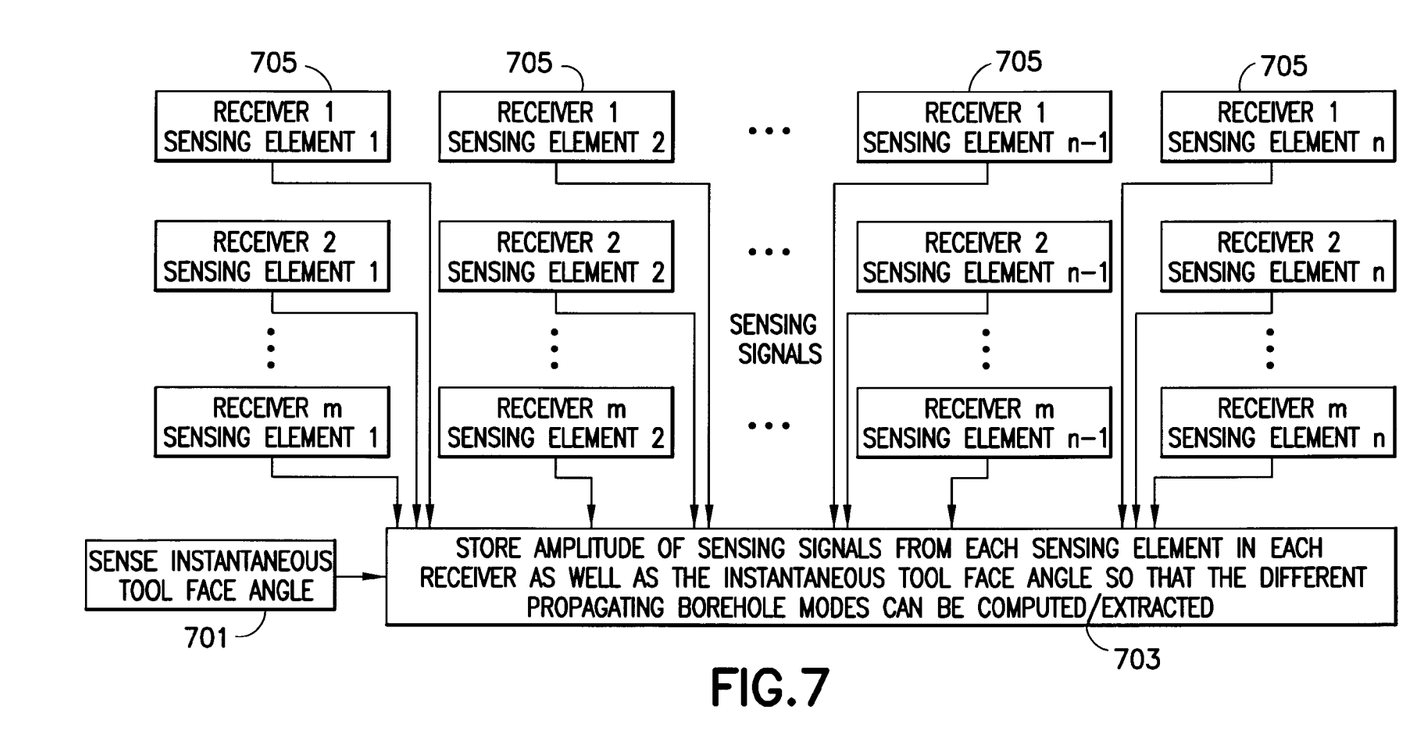
FIG. 7 depicts a flow diagram of the independent recording of each sensing element.

FIG. 7 is a flow diagram illustrating the capturing of the traces in all acoustic receivers associated with a logging event. The process of extracting the different multi-pole components of the field and the subsequent process of extracting acoustic rock properties from the recorded data, including anisotropic properties has been described in U.S. Pat. No. 4,594,691, entitled "Sonic Well Logging", and U.S. Pat. No. 7,623,412, entitled "Anisotropy measurement while drilling", the contents of both are herein incorporated by reference.

Referring to FIG. 7 the first step in the flow diagram is the instantaneous sensing of a tool face angle (701). In non-limiting examples, this step (701) is the same step as the step (601), or in other examples, the step (601) and the step (701) are carried out simultaneously. The next step (703) is the step of storing the amplitude of sensing signals from each sensing element (705) in each receiver as well as the instantaneous tool face angle so that the different propagating borehole modes can be computed or extracted.

Figure 8:
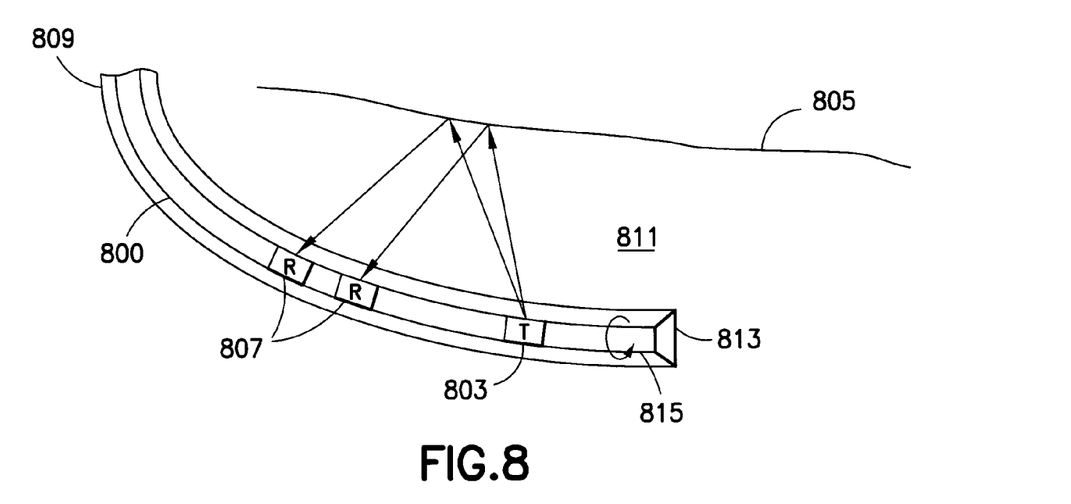
FIG. 8 depicts an alternate embodiment of the subject disclosure.

A further application of the subject disclosure which will benefit from having active control of the orientation of the acoustic source is Borehole Acoustic Reflection (and/or refraction) Surveys while drilling (LWD BARS). The BARS tool allows reservoir features such as reflectors and fractures to be imaged. Additional information regarding sonic imaging in general and the BARS tool in general may be found in the following documents, each of which is herein incorporated by reference. Yamamoto et al., entitled "Borehole Acoustic Reflection Survey Experiments in Horizontal Wells for Accurate Well Positioning", SPE/Petroleum Society of CIM 65538 and U.S. Pat. No. 6,956,790 to Jakob Haldorsen, entitled "Borehole Sonic Data Processing Method". FIG. 8 depicts active control of the acoustic source orientation which may be used to clearly detect a location of a geological marker, in a non-limiting example, a layer boundary. As illustrated in FIG. 8 a wellbore (809) is depicted with a logging while drilling tool (800). Connected to the lower end of the drill string is a drill bit (813). An acoustic source (803), in one non-limiting example, a dipole source is fired and one or a plurality of acoustic receivers (807) are used to record any signal reflected (811) from a geological feature, in one non-limiting example a layer boundary (805). The dipole source in one non-limiting example comprises at least four independently controlled source elements and in other examples comprises eight or more independently controlled source elements. The orientation of the acoustic source (803) can initially be rotated, either as the tool rotates (815) or with the active control of orientation described above. Processing is performed to get an initial indication for the presence of a reflector, and a rough estimate of the orientation. The processing has previously been described. See Yamamoto et al., entitled "Borehole Acoustic Reflection Survey Experiments in Horizontal Wells for Accurate Well Positioning", SPE/Petroleum Society of CIM 65538 and U.S. Pat. No. 6,956,790 to Jakob Haldorsen, entitled "Borehole Sonic Data Processing Method". After processing, the orientation of the acoustic dipole source can be controlled to point in the direction where the reflector is expected or as the tool rotates independently of the tool rotation, as depicted in FIG. 8, and multiple firings may be performed to more clearly define the location (orientation and distance) of the reflector. The control of the acoustic dipole source has been described above.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. §112, paragraph 6 for any limitations of any of the claims herein, except for those in which the claim expressly uses the words 'means for' together with an associated function.

What is claimed is:

1. An acoustic borehole logging tool comprising:
   at least one acoustic source comprising a plurality of source elements wherein each of the plurality of source elements is independently controlled so that the acoustic source can generate a multipole acoustic signal along different orientations with respect to the tool;
   at least one acoustic receiver comprising a plurality of acoustic sensing elements wherein each of the plurality of acoustic sensing elements is independently recorded;
   a plurality of sensors for determining an instantaneous tool face angle;
   a source firing control which uses the instantaneous tool face angle to control a firing of the plurality of source elements so that a direction of the multipole acoustic signal generated by the acoustic source is controlled to be geostationary and has one or more predetermined geostationary directions; and
   receiver recording electronics which use the instantaneous tool face angle to appropriately combine as recording of the plurality of acoustic sensing elements so that the receiver records a multipole acoustic signal along a geostationary direction and wherein the geostationary direction is chosen from one or more predetermined geostationary directions.

2. The acoustic borehole logging tool of claim 1 wherein the tool is a logging while drilling tool.

3. The acoustic borehole logging tool of claim 1 wherein the plurality of source elements are distributed around a circumference of a tool collar.

4. The acoustic borehole logging tool of claim 1 wherein the acoustic signals are dipole or quadrupole, or a higher multipole.

5. The acoustic borehole logging tool of claim 1 wherein the plurality of sensors are a combination of accelerometer, gyro and magnetometer.

6. The acoustic borehole logging tool of claim 1 comprising two predetermined geostationary 45° to each other and wherein the acoustic source is a quadrupole source.

7. The acoustic borehole logging tool of claim 1 comprising two predetermined geostationary directions at 90° to each other and wherein the acoustic source is a dipole source.

8. The acoustic borehole logging tool of claim 1 wherein the geo-stationary direction facilitates a stacking of a plurality of logging events associated with the one or more predetermined directions without averaging an anisotropic property of a formation.

9. The acoustic borehole logging tool of claim 1 wherein the plurality of sensing elements are distributed around a collar wall of a collar housing of the tool.

10. The acoustic borehole logging tool of claim 1 wherein the number of source elements is four or multiples of four and the acoustic signal is dipole.

11. The acoustic borehole logging tool of claim 1 wherein the number of source elements is eight or multiples of eight and the acoustic signal is dipole or quadrupole.

12. The acoustic borehole logging tool of claim 1 wherein the geostationary direction facilitates processing of acoustic data.

13. The acoustic borehole logging tool of claim 1 wherein the receiver is used to record the return acoustic signal from a geological feature and the orientation of the acoustic source is controlled to paint in a direction where the return acoustic signal is expected and multiple firings may be performed to more clearly define a location.

14. The acoustic borehole logging tool of claim 13 wherein the acoustic source is a dipole source.

15. The acoustic borehole logging tool of claim 1 comprising a plurality of acoustic sources.

16. The acoustic borehole logging tool of claim 1 comprising a plurality of acoustic receivers.

* * * * *